A. F. DIETZ.
BALE-TIES.

No. 193,808. Patented Aug. 7, 1877.

Witnesses:
Herbert T. Houghton
M. Gardner

Inventor:
Alanson F. Dietz.
By his Attorney,
Thos. Houghton.

UNITED STATES PATENT OFFICE.

ALANSON F. DIETZ, OF GUILDERLAND CENTRE, NEW YORK.

IMPROVEMENT IN BALE-TIES.

Specification forming part of Letters Patent No. 193,808, dated August 7, 1877; application filed July 9, 1877.

*To all whom it may concern:*

Be it known that I, ALANSON F. DIETZ, of Guilderland Centre, in the county of Albany and State of New York, have invented a new and useful Improvement in Bale-Ties, which improvement is fully set forth in the accompanying drawings and the following specification.

In the accompanying drawings, similar letters of reference indicate corresponding parts in the several figures.

Figure 1:
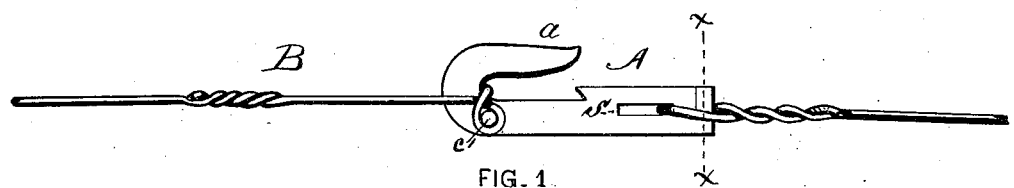
Figure 2:
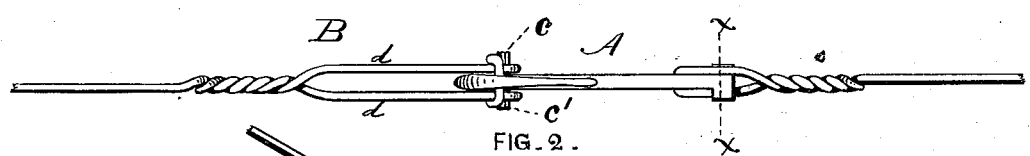
Figure 3:
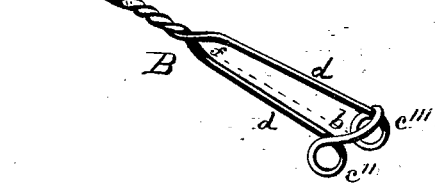
Figure 4:

Figure 1 is a side elevation of a bale-tie illustrating my invention. Fig. 2 is a top view of the same. Fig. 3 is a perspective view of the loop end of the wire, with its three loops or eyes $b$ $c''$ $c'''$. Fig. 4 is a vertical section on the line $x$ $x$, Fig. 1.

The object of my invention is to furnish a reliable fastening for bales of cotton, grain, straw, or other goods, that will not slip apart while the bale is still under the press, and that will securely lock the two ends of the tie together.

A is a hook, made of either wrought or cast metal, provided with a slot, S, near one end, and two shoulders, $s'$ $s'$, as shown in Figs. 1 and 4. Hook A is also provided with two projections or pins, $c$ $c'$, over which the eyes $c''$ $c'''$ of loop B pass.

B is a long loop of wire, formed with two side eyes, $c''$ $c'''$, as shown in Fig. 3. The loop from $b$ to $f$ should be long enough to pass easily over the hook end $a$ of hook A. The sides $d$ $d$ of loop B are as wide apart as the thickness of the hook and the length of one of the projections $c$ or $c'$, so that it may easily hook over them—first on one, then on the other.

It will be seen from the above that when the bale of straw, hay, cotton, or other goods to be baled is in the press, the band or wire is passed around said bale, and the loop B is then put over the hook A, and the two eyes $c''$ $c'''$ passed over the pins $c$ $c'$, and when in this condition the eyes $c''$ $c'''$ are pressed close up to the hook A; and when the bale is relieved from the pressure of the press, the eyes will be closed tightly upon the projections $c$ $c'$, thus locking the bale-tie securely in place.

It will also be seen that this tie cannot, by any ordinary accident, be unhooked.

Having described my invention and its mode of application in such clear and exact terms that those skilled in the art to which it appertains may use the same, what I claim as new, and desire to secure by Letters Patent, is—

The hook A, with projections or pins $c$ $c'$, and loop B, constructed with two side loops, $c''$ $c'''$, in combination, and operating substantially as and for the purpose herein set forth.

ALANSON F. DIETZ.

Witnesses:
    FREDK. KUNHOLTZ,
    HIRAM GRIGGS.